US012071777B2

(12) United States Patent
Kelly et al.

(10) Patent No.: US 12,071,777 B2
(45) Date of Patent: Aug. 27, 2024

(54) SAFETY GATE

(71) Applicant: GLOBAL ENGINEERS TECHNOLOGY PTE. LTD., Singapore (SG)

(72) Inventors: Bernard Kelly, Mittagong (AU); Damon Hanlin, Kellyville (AU)

(73) Assignee: GLOBAL ENGINEERS TECHNOLOGY PTE. LTD., Singapore (SG)

( * ) Notice: Subject to any disclaimer, the term of this patent is extended or adjusted under 35 U.S.C. 154(b) by 76 days.

(21) Appl. No.: 17/632,042

(22) PCT Filed: Jun. 30, 2020

(86) PCT No.: PCT/SG2020/050375
§ 371 (c)(1),
(2) Date: Feb. 1, 2022

(87) PCT Pub. No.: WO2021/025614
PCT Pub. Date: Feb. 11, 2021

(65) Prior Publication Data

US 2022/0275658 A1 Sep. 1, 2022

(30) Foreign Application Priority Data

Aug. 2, 2019 (SG) ........................... 10201907176Q

(51) Int. Cl.
*E04G 21/32* (2006.01)
*B66B 13/30* (2006.01)
*E04G 21/16* (2006.01)

(52) U.S. Cl.
CPC .......... *E04G 21/3233* (2013.01); *B66B 13/30* (2013.01); *E04G 21/166* (2013.01)

(58) Field of Classification Search
CPC .... E04G 21/3233; E04G 21/166; B66B 13/30
See application file for complete search history.

(56) References Cited

U.S. PATENT DOCUMENTS 2,820,256 A * 1/1958 Dahl ...................... A47B 43/02 52/280
4,444,289 A * 4/1984 Jungman .............. E04G 21/166 52/749.1
(Continued)

FOREIGN PATENT DOCUMENTS

CN 2630385 Y 8/2004
CN 204474105 U 7/2015
(Continued)

OTHER PUBLICATIONS

International Search Report issued in PCT/SG2020/050375, dated Oct. 19, 2020, 6 pages.
(Continued)

*Primary Examiner* — Michael A Riegelman
(74) *Attorney, Agent, or Firm* — Rothwell, Figg, Ernst and Manbeck, P.C.

(57) ABSTRACT

A foldable safety gate apparatus for use in relation to a hoist or lift, comprising: a main safety gate body, said main safety gate body comprising: a gate frame forming an opening; and a gate, wherein the gate frame holds said gate within the opening for preventing entry into a hoist car; a cantilever platform, said cantilever platform comprising: a supporting arm for securing to a slab; and two or more load points or securing the cantilever platform to the slab; wherein, when in a deployed state, the main safety gate body is substantially perpendicular to the cantilever platform, and, when in a collapsed state, the main safety gate body rests substantially parallel to the cantilever platform.

11 Claims, 11 Drawing Sheets

(56) References Cited

U.S. PATENT DOCUMENTS

| | | | | | |
|---|---|---|---|---|---|
| 4,742,653 | A * | 5/1988 | Napier | E04B 1/3445 52/68 |
| 4,880,210 | A * | 11/1989 | Cucksey | E04G 21/3204 256/73 |
| 6,050,032 | A * | 4/2000 | Yamada | E06B 11/00 52/64 |
| 7,815,014 | B2 * | 10/2010 | Preston | E04G 21/166 182/223 |
| 10,280,637 | B2 * | 5/2019 | McKeon | B65G 69/22 |
| 10,703,591 | B2 * | 7/2020 | Preston | B65G 69/22 |
| 11,598,106 | B2 * | 3/2023 | Garbers | B66B 19/00 |
| 2003/0029825 | A1 * | 2/2003 | Baxter Sr. | B66C 23/201 212/179 |
| 2009/0020362 | A1 * | 1/2009 | Diaz | E04G 21/16 182/113 |
| 2015/0152656 | A1 * | 6/2015 | Mckeon | E04G 3/28 414/800 |
| 2016/0348382 | A1 * | 12/2016 | McKeon | E04G 3/28 |
| 2017/0096824 | A1 * | 4/2017 | Melic | E04G 21/3228 |
| 2018/0223549 | A1 * | 8/2018 | Snell | B66C 1/10 |
| 2018/0305940 | A1 * | 10/2018 | Liggins | E04G 21/166 |
| 2020/0347622 | A1 * | 11/2020 | Lazzari | B66C 23/201 |
| 2022/0275658 | A1 * | 9/2022 | Kelly | E04G 21/166 |

FOREIGN PATENT DOCUMENTS

| | | | |
|---|---|---|---|
| CN | 107338965 | A | 11/2017 |
| CN | 208182433 | U | 12/2018 |
| EP | 0419250 | A2 | 3/1991 |

OTHER PUBLICATIONS

Written Opinion issued in PCT/SG2020/050375, dated Oct. 19, 2020, 6 pages.

* cited by examiner

SAFETY GATE

CROSS REFERENCE TO RELATED APPLICATION

This application is a 35 U.S.C. 371 National Phase Entry Application from PCT/SG2020/050375, filed Jun. 30, 2020, which claims the benefit of Singapore Patent Application No. 10201907176Q filed on Aug. 2, 2019, the disclosure of which are incorporated herein in their entireties by reference.

TECHNICAL FIELD

This invention relates to a gate used in relation with a hoist, in particular to a gate that can be set up and taken down quickly.

BACKGROUND

During the construction of a building, there is a need to install a lift or hoist in order to provide access to the construction workers, along with their tools and building materials. These lifts or hoists may be temporary in nature and are typically installed on an external façade of a building, although it can also be installed within the building or lift-shaft to be constructed, and at the end of the build, can be taken down and reused.

During the installation of the lift or hoist, the landing area is fitted with guide rails and/or a gate, and the base of the lift or hoist is fenced off to prevent inadvertent injury. This is assessed prior to commencement of lift operations, typically according to a set of rules or regulations.

For each level that the lifts or hoists service, there is a gate that would provide a physical barrier to prevent any missteps as users enter or leave the lifts or hoists. This gate would also control entry to the lifts or hoists, especially when the lift car is not on the floor. These would adhere to the safety regulations for the jurisdiction of use. Given the height of modern buildings, these gates can be numerous. Installing and taking down of the entire lift system (lifts or hoists with the gates) is typically a manual process that requires workers to install individual components of the lift system, using a crane to carry the items in place, and typically takes 4 hours per floor. Thus any reduction in installation and/or takedown time in a single floor would mean significant cost savings all round.

Hence, there is a need for a gate that can be installed or taken down quickly while providing an effective safety barrier to users of the lift.

BRIEF SUMMARY

The above and other problems are solved and an improvement in the art is made by a safety gate in accordance with this invention. A first advantage of the safety accordance with this invention is that the time needed to set up the gate is reduced significantly. The gate in a package system reduces the possibility of components falling to the ground during installation. A second advantage of the safety gate in accordance with this invention is that the gate in a package means that requisite parts are not lost in the process. This is because all the parts are transported in a package and installed on site, without require external parts, fixtures, or fasteners. A third advantage of the safety gate in accordance with this invention is that moving the packed gates is more efficient as the gates can be stacked and transported in a safe manner. This allows more gates to be transported per trip, yet ensure that no parts are lost in transit.

A first aspect of the present invention provides a foldable safety gate apparatus for use in relation to a hoist or lift, comprising: a main safety gate body, said main safety gate body comprising: a gate frame forming an opening; and a gate, wherein the gate frame holds said gate within the opening for preventing entry into a hoist car; a cantilever platform, said cantilever platform comprising: a supporting arm for securing to a slab; and two or more load points or securing the cantilever platform to the slab; wherein, when in a deployed state, the main safety gate body is substantially perpendicular to the cantilever platform, and, when in a collapsed state, the main safety gate body rests substantially parallel to the cantilever platform.

Preferably, the gate is single barrier gate. Alternatively, the gate comprises a left gate and a right gate. Preferably, the gate comprises a hinge to open inwards and/or outwards. Alternatively, the gate is installed on a sliding rail to slide aside to reveal the opening. Preferably, the safety gate apparatus further comprises two side panels positioned, when in a deployed date, substantially perpendicular to both the main safety gate body and the cantilever platform. Further preferably, wherein the two side panels are connected to the main body of the safety gate by hinges such that they can be folded inwards towards the main safety gate body in the collapsed state. Further preferably, wherein the two side panels are mesh side panels. Further preferably, the safety gate apparatus comprising guard rails for further extending the barrier formed by the two side panels when in a deployed state. Further preferably, the safety gate apparatus further comprising lifting points for facilitating lifting of the apparatus by a crane. Further preferably, the safety gate apparatus comprising an anchor through which loads may be applied.

Further preferably, wherein the supporting arm is supported with hardwood packing at the slab edge.

A second aspect of the present invention provides a stack of up to ten of the safety gate apparatuses, as defined above, in their collapsed state.

Preferably, wherein the stack of up to ten of the safety gate apparatuses are arranged by lining up a bottom side of the safety gate apparatus with a top side of an adjacent safety gate apparatus. Further preferably, wherein the stack of up to ten of the safety gate apparatuses are offset from each other such that they can be secured.

The preferred features may be combined as appropriate, as would be apparent to a skilled person, and may be combined with any of the aspects of the invention.

BRIEF DESCRIPTION OF THE DRAWINGS

The invention is illustrated by way of example with reference to the accompanying drawings which show a safety gate constructed in accordance with the invention. The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

The various configurations discussed in these non-limiting examples can be varied and are used to illustrate at least one embodiment and are not intended to limit the scope thereof.

Figure 1:
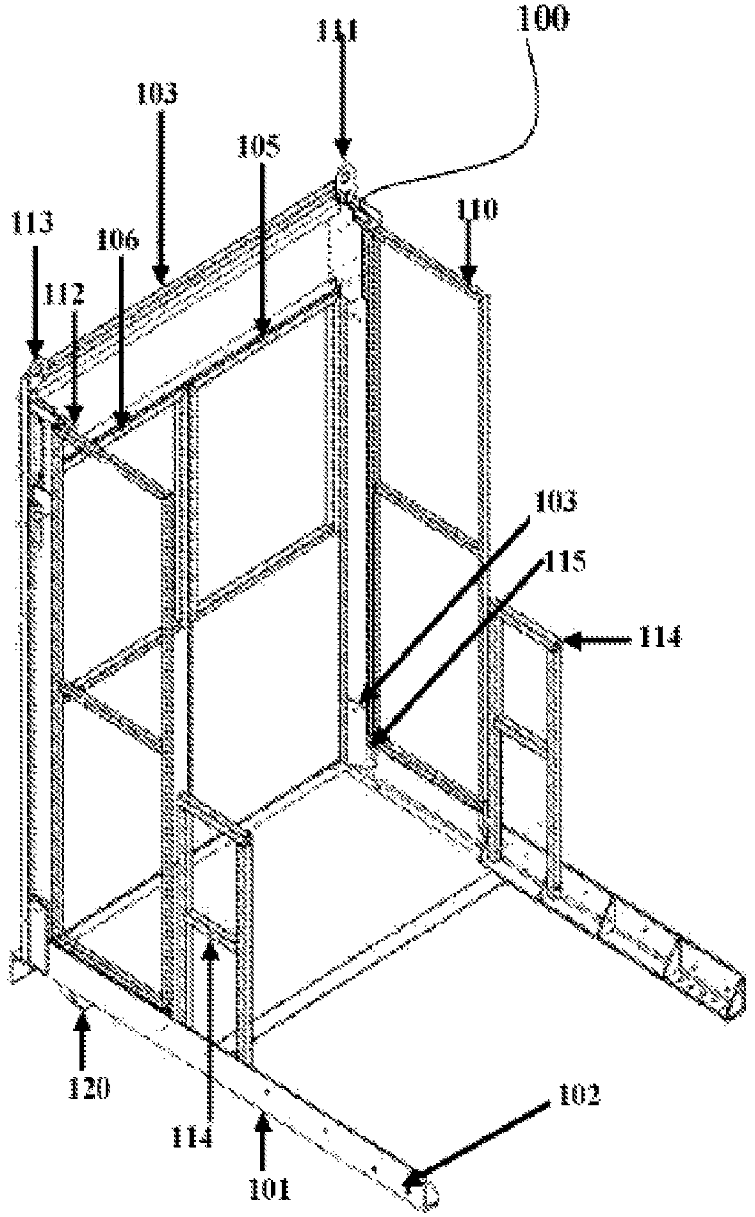
FIG. 1 shows a safety gate according to an embodiment of the invention.

Referring to the drawings, FIG. 1 shows a safety gate 100 in a fully deployed state. There is a supporting arm 101 that forms a cantilever platform and these are secured or anchored to slabs using various load points 102 to loads. These loads are for each side of the cantilever platform assembly and are ultimate limit state loads.

Figure 13:
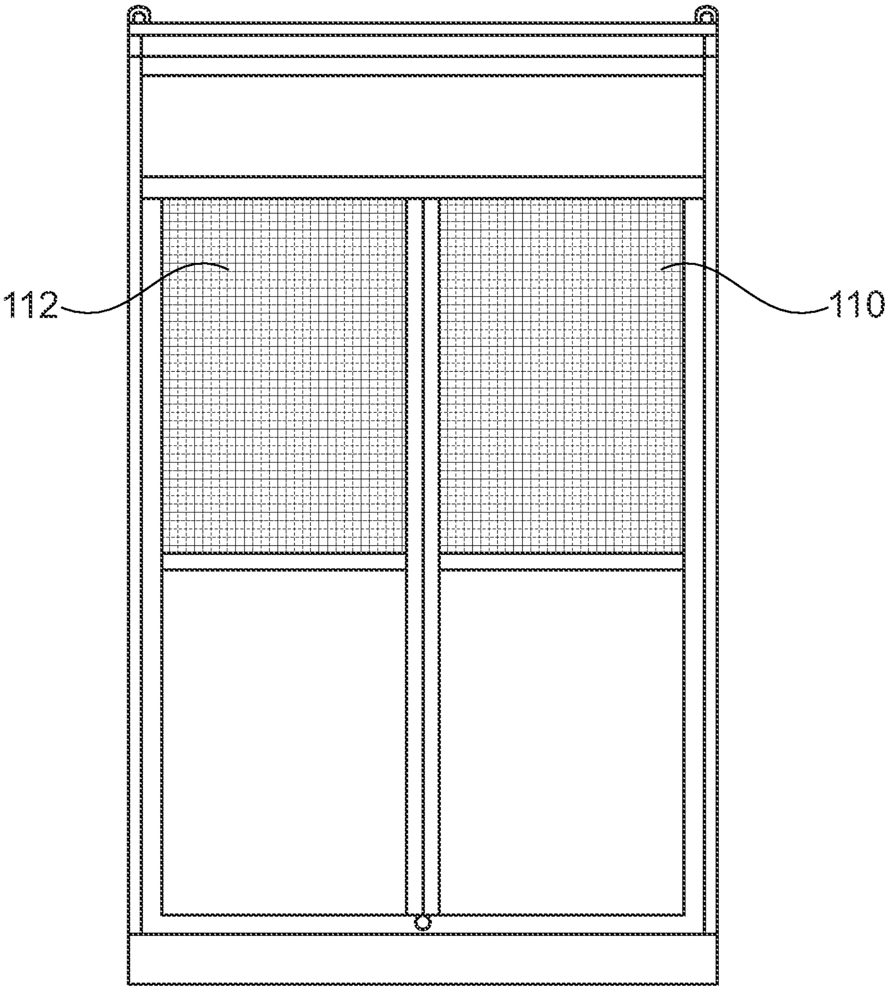
FIG. 13 shows a detailed view of the gates from a user approaching the safety gate.
Figure 14:
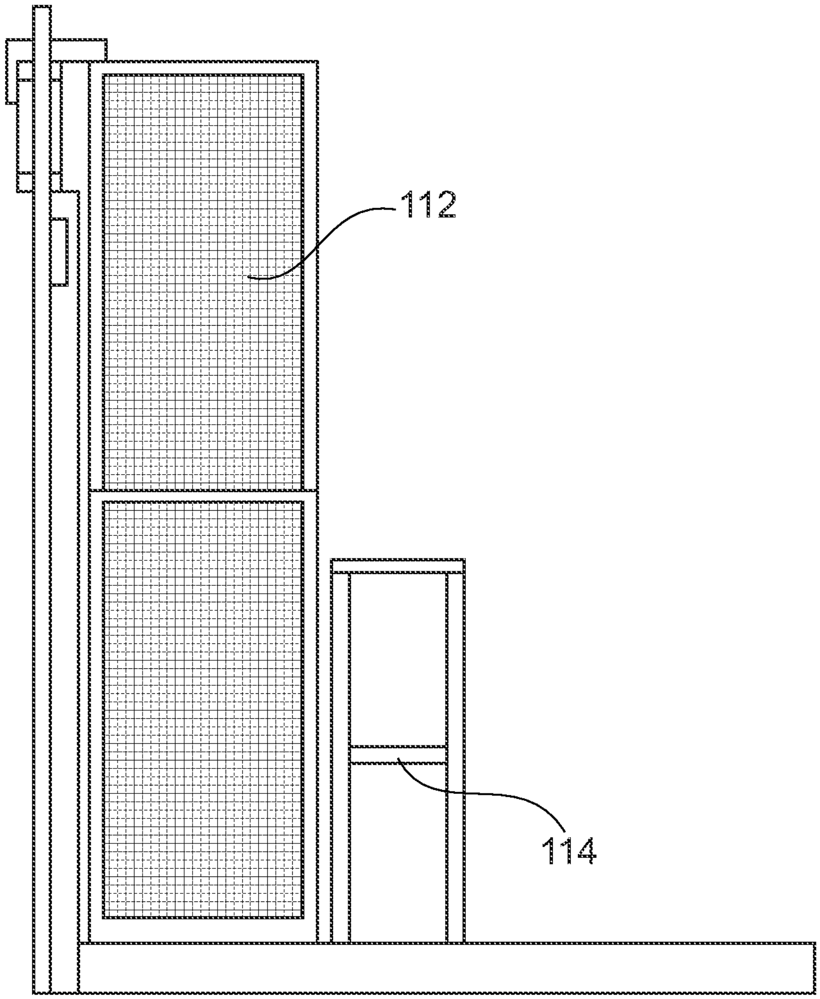
FIG. 14 shows a side view of the safety gate.

The main body of the safety gate is formed by a gate frame 103 that holds a gate that prevents entry into the hoistcar through the opening in the gate frame. In this embodiment, a left gate 105 and a right gate 106 is shown, although other types of gates can be installed such as a single barrier gate. Further, the gate can either be hinged to open inwards, outwards or even installed on a sliding rail to slide aside to reveal the opening. A detailed view of the gates from a user approaching the safety gate is shown FIG. 13. Also installed on the main body of the safety gate is a mesh side panels 110, 112. These side panels prevent users of the hoist from inadvertently falling off the platform, and can be connected to the main body of the safety gate using hinges 115 so that it can be folded flat in a folded state, yet secured with bolts or a catch in a deployed state. In some embodiments, the mesh side panel has a mesh surface to allow visibility and ventilation while being lightweight, while in other embodiments, the mesh may be replaced with glass or plastic for better views, along with variations in designs to allow openings for ventilation. The hinges 115 are designed for the invention in mind based on the purposes describe. A side view of the safety gate is shown in FIG. 14.

During the installation, the gate is deployed and opened on the ground before being hoisted in place to the appropriate floor using the lifting points 111 and 113, which allow the gate to be easily lifted into place by a crane, and secured at the load points 102. Bolts can be used to ensure that the gate is held in place.

Also shown are guard rails 114 with further extend the barrier formed by the mesh side panels 110, 112, and these guard rails 114 also guide a user of the hoistcar and prevents inadvertent falling off the building being constructed. Guard rails 114 are stored in between gates 105 & 106 and 112 & 110.

Figure 2:
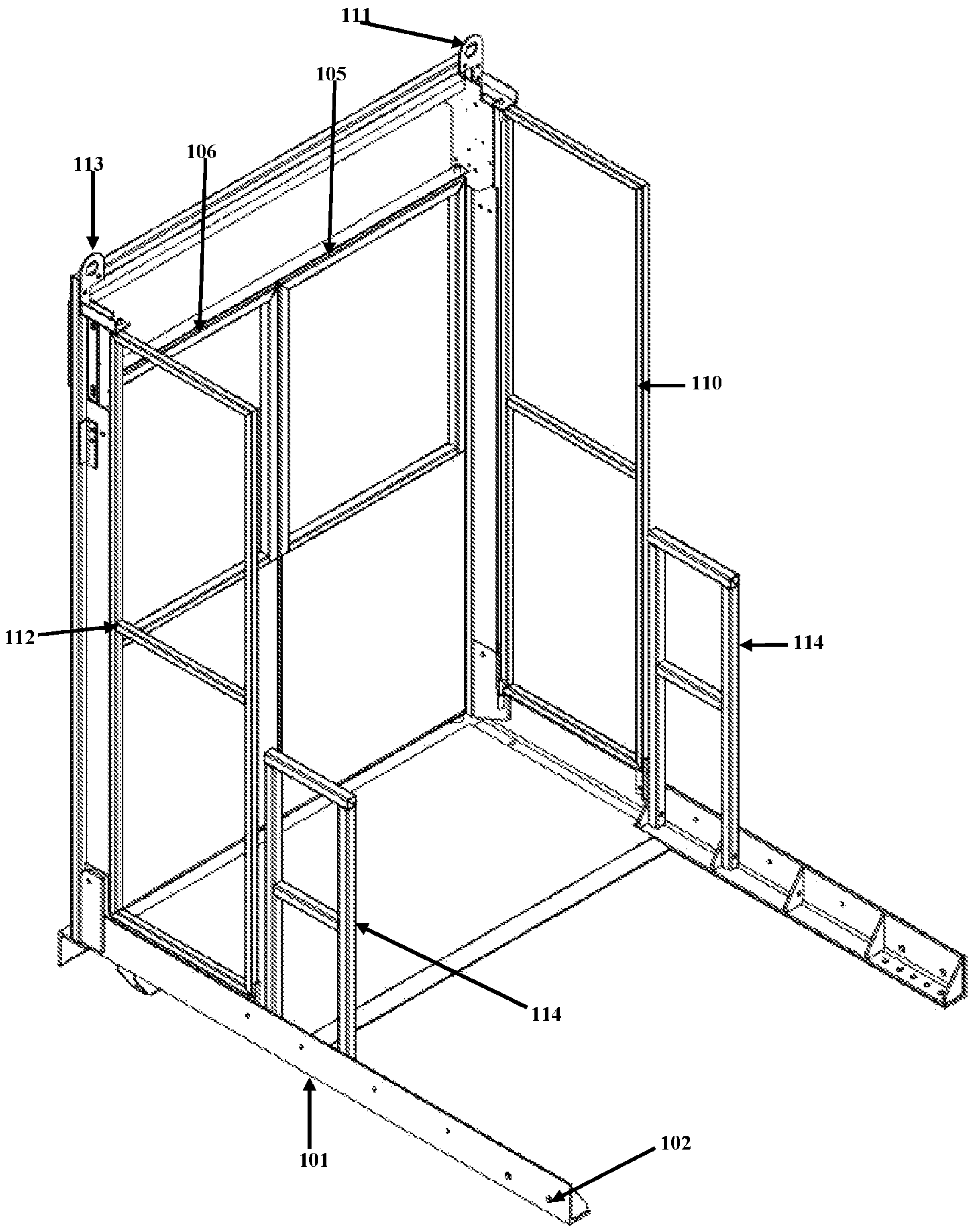
FIG. 2 shows a detailed perspective top view of a safety gate according to an embodiment of the invention.

A more detailed view of the safety gate can be seen in FIG. 2.

Figure 3:
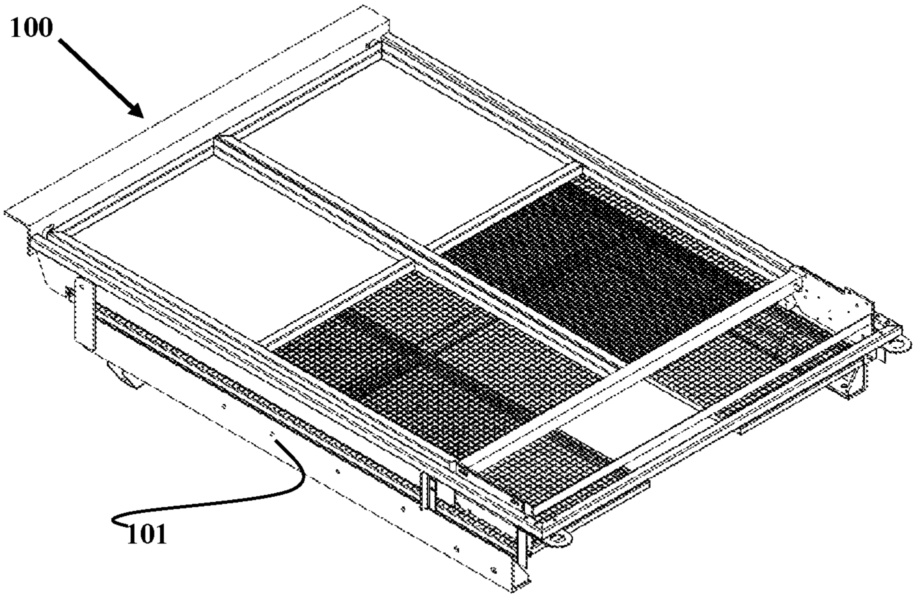
FIG. 3 shows a perspective top view of the safety gate in a collapsed form according to an embodiment of the invention.

FIG. 3 shows the safety gate 100 in its folded state. This is a collapsed form which allows many gates to be stored and transported efficiently. In this collapsed form, the main gate frame 103 would rest on the platform structure with the supporting arm 101. All the requisite parts are also on hand as the gate in the kit form, and there can be provision for all the parts needed for the gate to be stored on the gate in its folded form. The bolts that are used to secure the gate can be stored by being bolted to various points on the safety gate 100.

It can be seen that the footprint of the safety gate 100 is significantly smaller than the gate in a deployed form, and having the gate in a collapsed form also means that all the requisite parts would be on hand if required to install, since all the major components are present in a stacked format.

Figure 4:
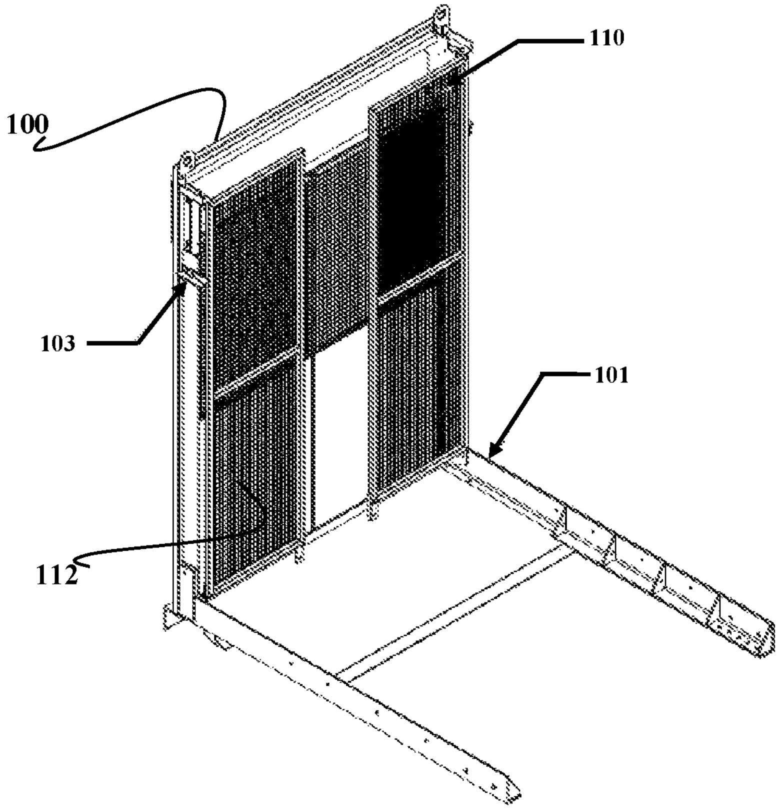
FIG. 4 shows a perspective top view of the safety gate in a partially open form according to an embodiment of the invention.

FIG. 4 shows the safety gate 100 partially open with the main body 103 ready to deploy the mesh side panel 110 after raising the main body to be perpendicular from the from supporting arm 101.

Figure 5:
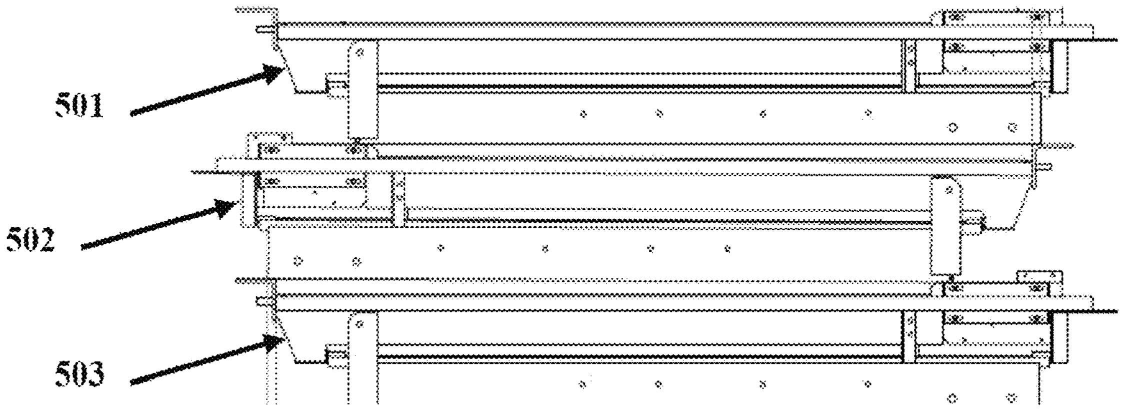
FIG. 5 shows a side view of the safety gate in a collapsed form with several safety gates stacked on each other.
Figure 15:
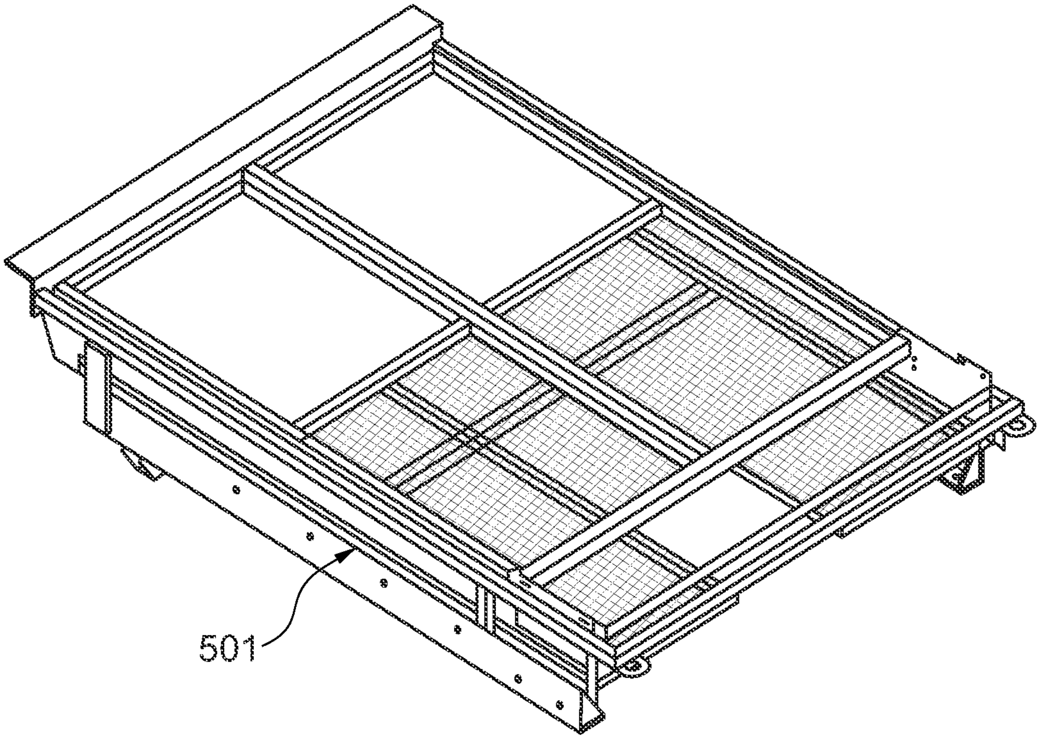
FIG. 15 shows a folded safety gate in perspective view.

The safety gate 100 can be folded to be stacked for efficiency during transportation and storage. In some embodiments, up to 10 such folded gates can be stacked up for storage or transportation, although for the purposes of illustration only 3 safety gates 501, 502, 503 are shown in FIG. 5. One way of stacking the safety gates would be to line up the end of the bottom of the folded safety gate 501 with the top of the folded safety gate 502, which in turn is stacked and lined up with the bottom of folded safety gate 503. The stacked safety gates may also be offset from each other during the stacking to ensure the gates can be secured or bolted down accordingly. FIG. 15 shows a folded safety gate in perspective view.

Figure 6A:
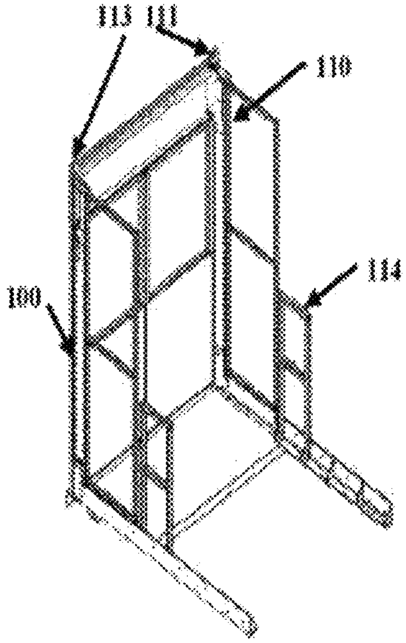
FIGS. 6A, 6B, and 6C show the process of folding the safety gate in its fully deployed form, partially deployed form, and fully collapsed form respectively.
Figure 6B:
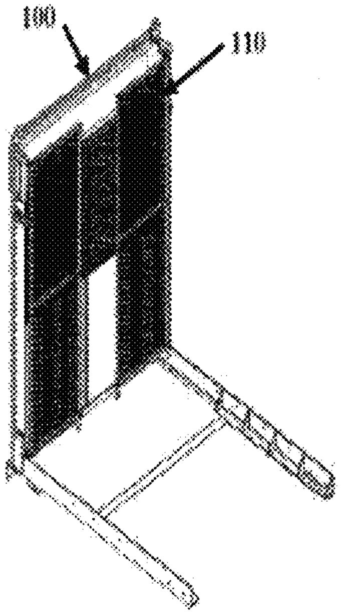
Figure 6C:
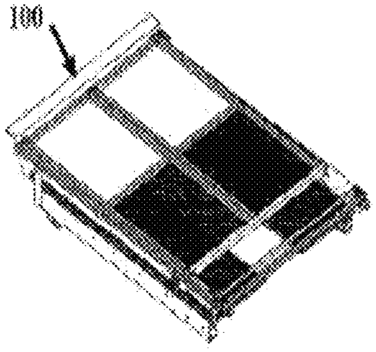

FIGS. 6A, 6B, and 6C show how the safety gate is folded, essentially the installation process in reverse, once the safety gate has been crane lifted via the lifting points 111, 113 to the ground. The mesh side panels 110 are folded inwards towards the main body of the safety gate and the guard rails 114 are removed and stored.

Figure 7:
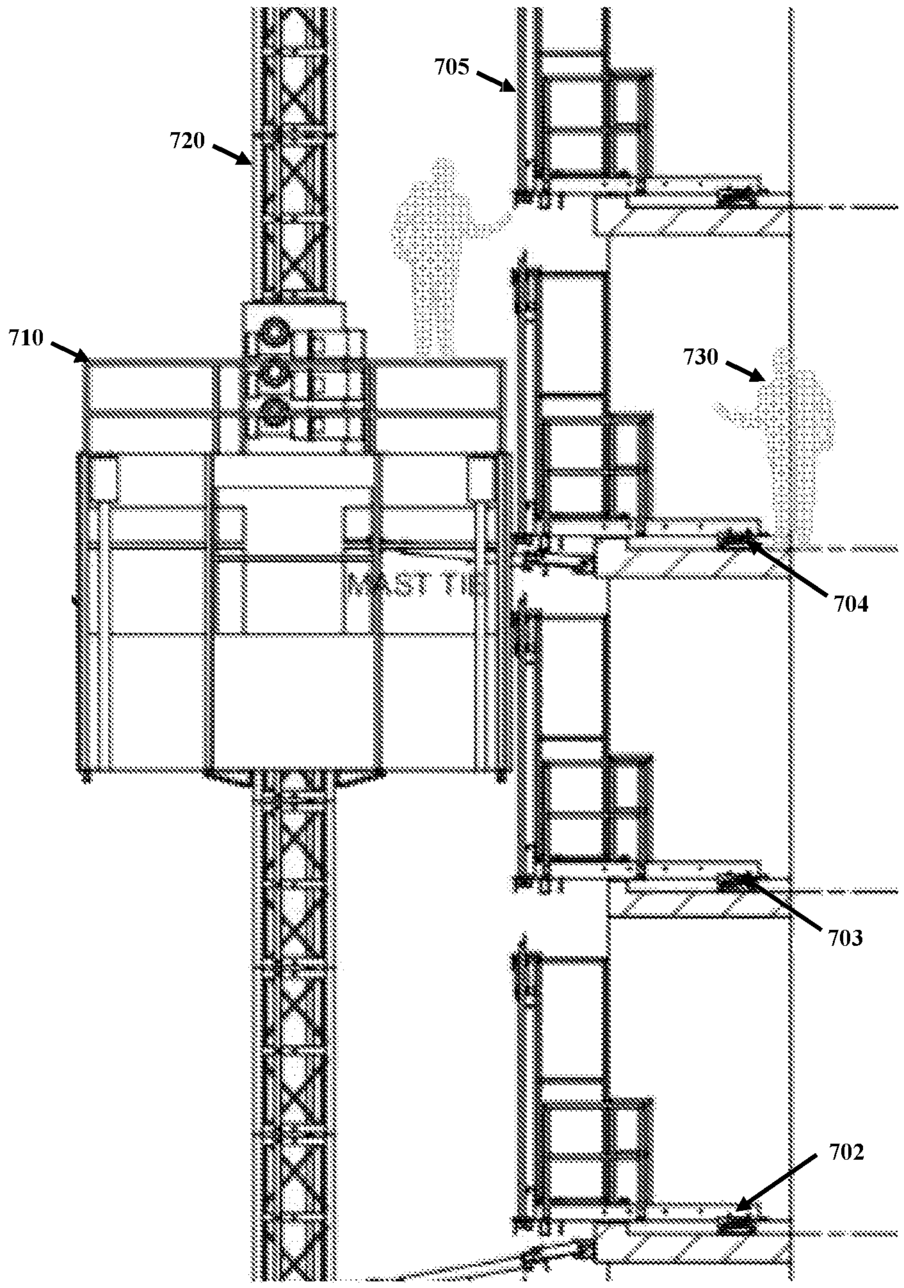
FIG. 7 shows a side view of the safety gate used with the lifts or hoists when installed in a building.
Figure 8:
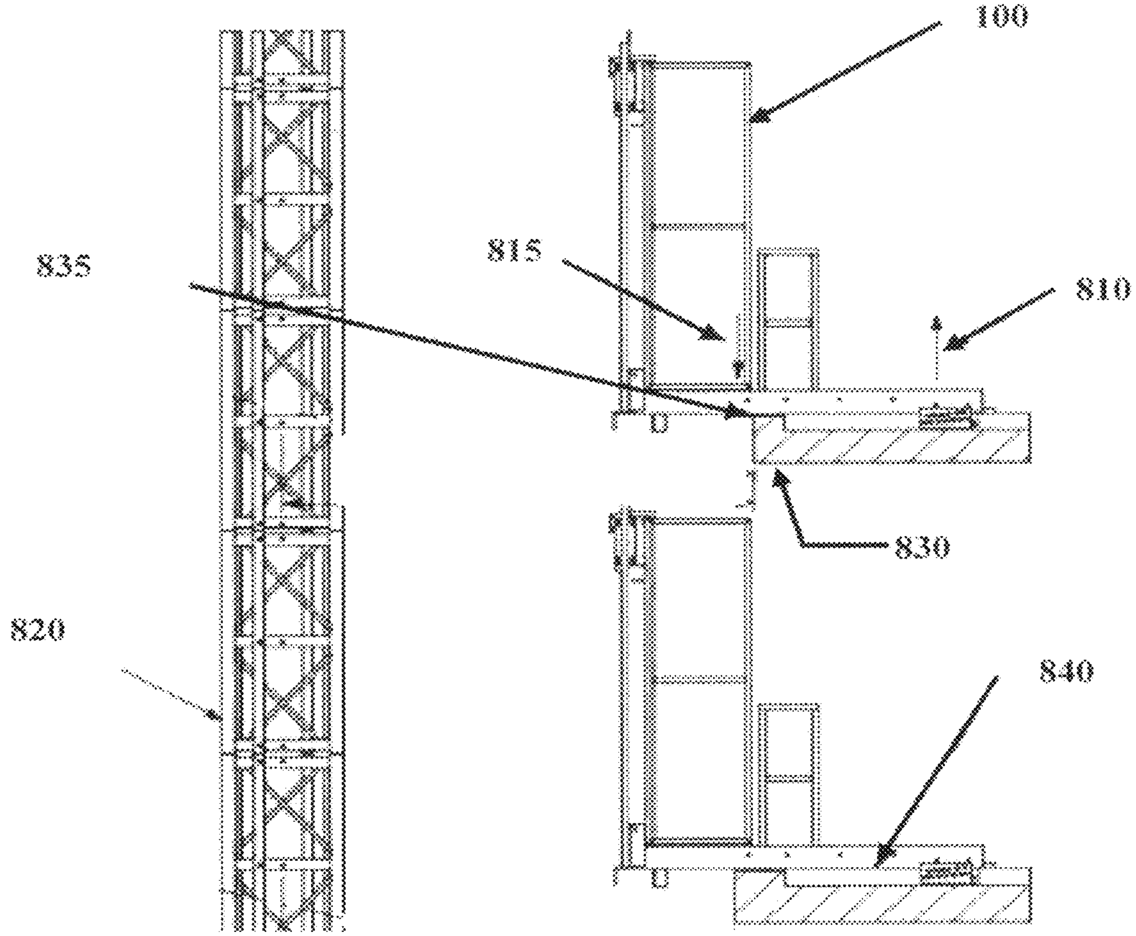
FIG. 8 shows a detailed side view of the safety gate in use when installed in a building.

During installation or removal of the safety gate or drop-in gate, the hoistcar 710 of the hoist tower 720 may be used to assist in the installation of the safety gate once a crane has lifted the safety gate to its requisite floor using the lifting points 111, 113 (not shown in FIG. 7). Several safety gates 702, 703, 704, and 705 are shown in the exemplary embodiment of FIG. 7, these represent the various floors that are serviced by the hoistcar, thus requiring the safety gates. Also shown is a human worker 730 for scale, whereby standing on the top of the hoistcar, he is able to measure the clearance from the hoistcar and bolt down the safety gate 705 based on the various engineering specifications. When removing the safety gate, the hoistcar 710 of the hoist tower 720 may be used to assist by allowing a worker to unbolt based on engineering specifications and have the safety gate 705 lifted down using a crane via its lifting points.

During installation of the safety gate 100, loads for each side of the safety gate 100 may be used and these can be ultimate limit state loads. There are anchors 810 through which loads may be applied and slabs may be used. The load onto the slab 830 edge can be done through the beam 815. And back propping or slab 830 strengthening can be provided if required. Each needle or supporting arm 101 can be supported with hardwood packing at the slab edge 835. Ramps or infills 840 can be carried out to secure the safety gate 100. The hoist tower or hoist mast 820 is shown for reference in relation to the safety gate 100.

Figure 9:
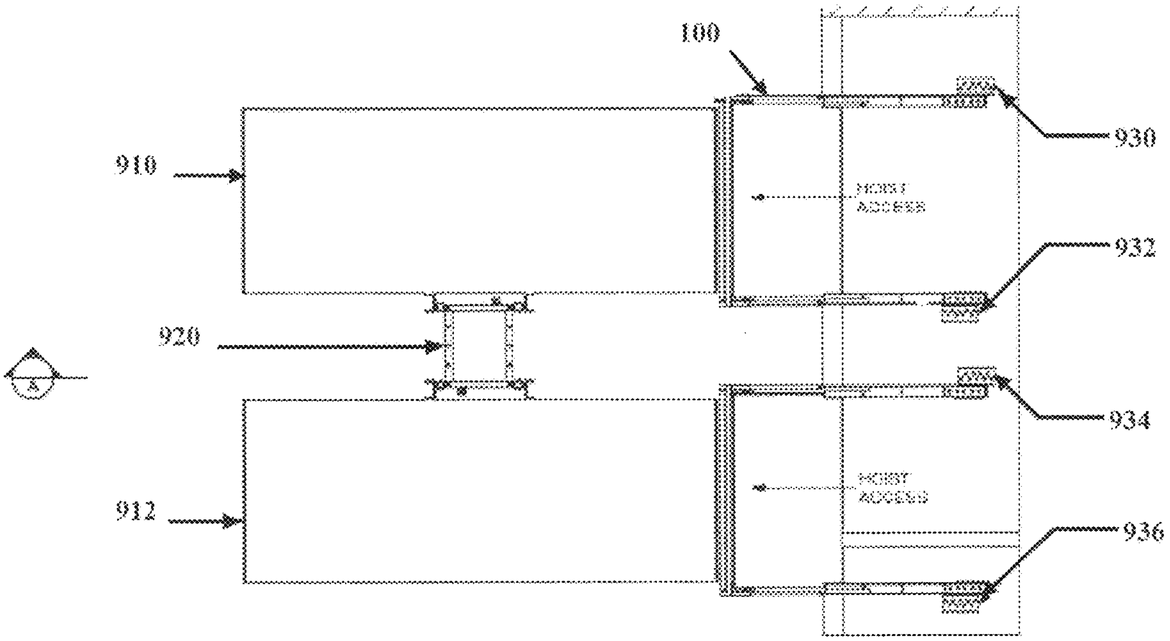
FIG. 9 shows a plan view of the safety gate in use when installed in a building.

A plan or top overhead view of the installed safety gate 100 is shown in FIG. 9 where the hoist cars 910 and 912 are shown with the hoist tower 920. Loads can be applied at various points 930, 932, 934, 936 to secure the safety gate in the building. Access to the hoist car is also shown.

Figure 10:
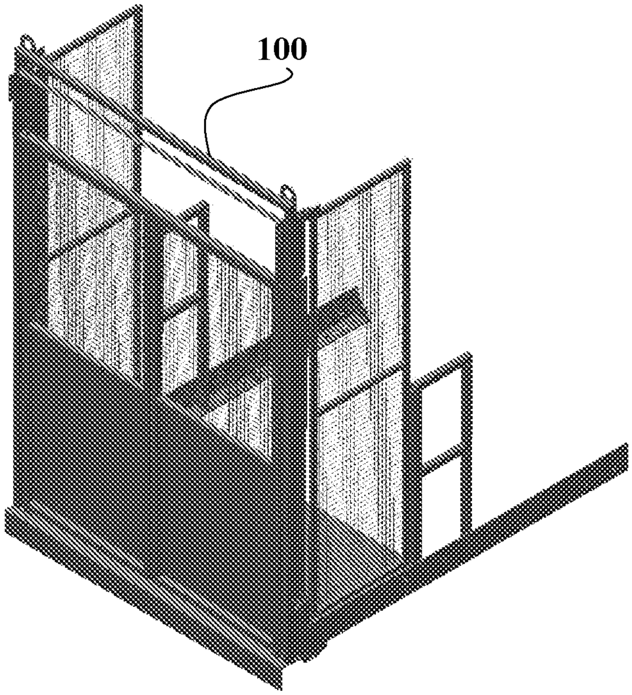
FIGS. 10, 11, and 12 show rendered views of the deployed safety gate in accordance with an embodiment of the invention.
Figure 11:
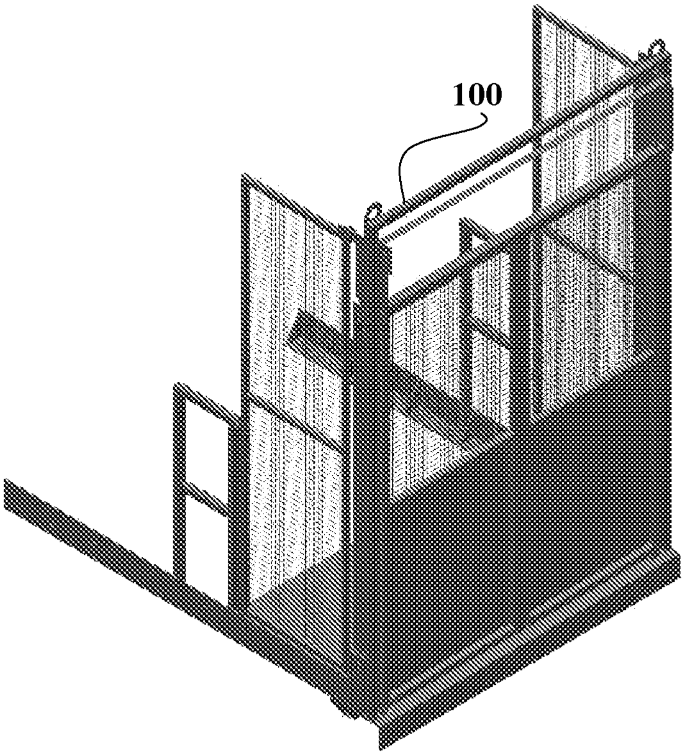
Figure 12:
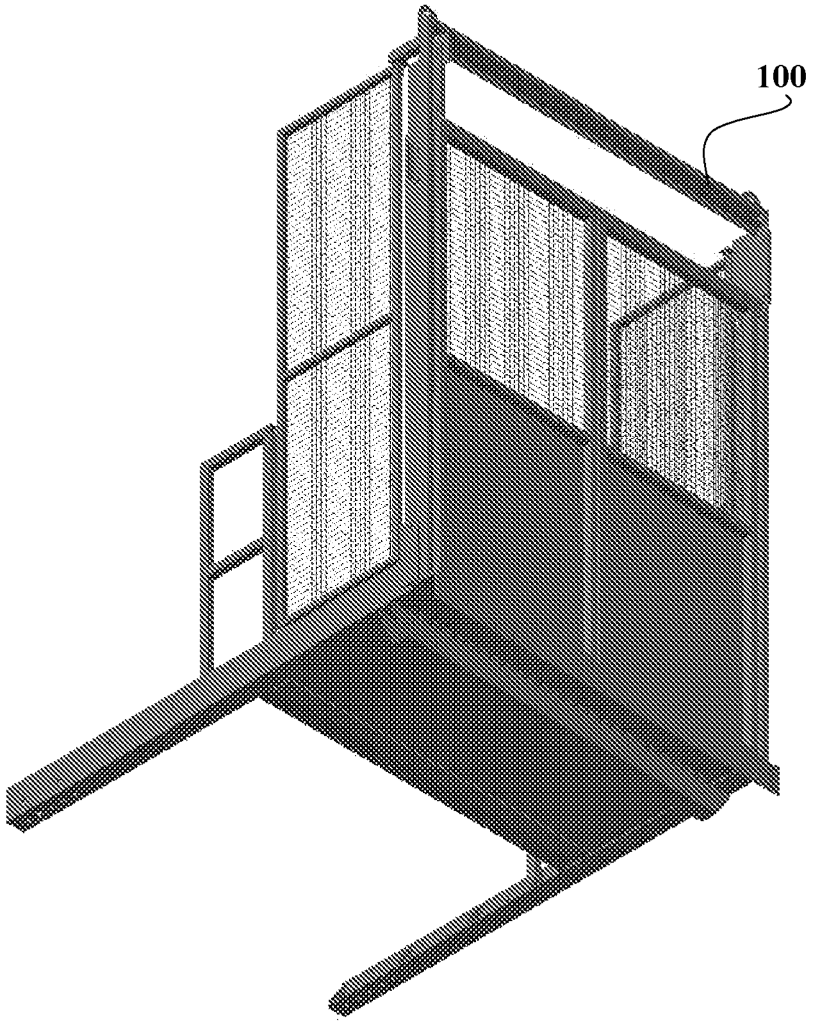

FIGS. 10-12 show embodiments of the safety gate 100 when rendered in CAD in a fully deployed state in preparation for installation in the building with the hoist.

Thus, the present invention has been fully described with reference to the drawing figures. Although the invention has been described based upon these preferred embodiments, to those of skill in the art, certain modifications, variations, and alternative constructions would be apparent, while remaining within the spirit and scope of the invention.

The invention claimed is:

1. A foldable safety gate apparatus for use in relation to a hoist or lift, comprising:

a main safety gate body, said main safety gate body comprising:
 a gate frame forming an opening; and
 a gate, wherein the gate frame holds said gate within the opening for preventing entry into a hoist car;

a cantilever platform, said cantilever platform comprising:
 a supporting arm for securing to a slab;
 two or more load points for securing the cantilever platform to the slab;

two side panels, wherein the two side panels are connected to the gate using hinges so that the two side panels can be folded flat in the collapsed state and when in the deployed state, and the two side panels are positioned substantially perpendicular to both the main safety gate body and the cantilever platform; and
 guard rails for further extending a barrier formed by the two side panels when in a deployed state and being stored in between the gate and the two side panels in the collapsed state, wherein, when in a deployed state, the main safety gate body is substantially perpendicular to the cantilever platform, and, when in a collapsed state, the main safety gate body rests substantially parallel to the cantilever platform.

2. The safety gate apparatus of claim 1, wherein the gate comprises a left gate and a right gate.

3. The safety gate apparatus of claim 1, wherein the gate comprises a hinge to open inwards and/or outwards.

4. The safety gate apparatus of claim 1, wherein the two side panels are connected to the main safety gate body by the hinges such that they can be folded inwards towards the main safety gate body in the collapsed state.

5. The safety gate apparatus of claim 1, wherein the two side panels are mesh side panels.

6. The safety gate apparatus of claim 1, further comprising lifting points for facilitating lifting of the apparatus by a crane.

7. The safety gate apparatus of claim 1, further comprising an anchor through which loads can be applied.

8. The safety gate apparatus of claim 1, wherein the supporting arm is supported with hardwood packing at a slab edge.

9. A stack of a plurality of the safety gate apparatuses as defined in claim 1, wherein the safety gate apparatuses are in their collapsed state, and
a number of the safety gate apparatuses in the stack is less than or equal to 10.

10. The stack of claim 9, wherein the plurality of the safety gate apparatuses in the stack are arranged by lining up a bottom side of the safety gate apparatus with a top side of an adjacent safety gate apparatus.

11. The stack of claim 9, wherein the plurality of the safety gate apparatuses in the stack are offset from each other such that they can be secured.

* * * * *